(12) United States Patent
Raddatz

(10) Patent No.: US 7,542,678 B2
(45) Date of Patent: Jun. 2, 2009

(54) METHOD AND APPARATUS FOR A SUPERVISORY CHANNEL IN A WDM FIBER-OPTIC COMMUNICATION SYSTEM

(75) Inventor: Lutz Raddatz, Nürnberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 596 days.

(21) Appl. No.: 11/027,847

(22) Filed: Dec. 30, 2004

(65) Prior Publication Data

US 2006/0147205 A1 Jul. 6, 2006

(51) Int. Cl.
*H04J 12/02* (2006.01)
*H04B 10/08* (2006.01)

(52) U.S. Cl. ............... 398/83; 398/30; 398/31; 398/32; 398/82; 398/186; 398/187; 398/188

(58) Field of Classification Search ............ 398/30, 398/31, 32, 82, 83, 186, 187, 188
See application file for complete search history.

(56) References Cited

U.S. PATENT DOCUMENTS

| 3,809,816 | A | * | 5/1974 | Reed et al. | 370/295 |
|---|---|---|---|---|---|
| 6,323,978 | B1 | * | 11/2001 | Harley et al. | 398/30 |
| 6,515,777 | B1 | * | 2/2003 | Arnold et al. | 398/97 |
| 2002/0031324 | A1 | * | 3/2002 | Cao et al. | 385/140 |
| 2003/0095736 | A1 | * | 5/2003 | Kish et al. | 385/14 |
| 2005/0089325 | A1 | * | 4/2005 | Shan | 398/30 |

OTHER PUBLICATIONS

Ramaswami and Sivarajan, "Optical Networks, a Practical Perspective", 1998, Morgan Kaufman Publishers, pp. 336-337.*

* cited by examiner

*Primary Examiner*—Ken N Vanderpuye
*Assistant Examiner*—Daniel G Dobson

(57) ABSTRACT

A method and apparatus for providing a supervisory channel in a wavelength division multiplexing (WDM) fiber-optic communication system uses a controlled optical attenuator disposed in an optical path between a demultiplexer (DMUX) and a multiplexer (MUX) of an Optical Add-Drop Multiplexer (OADM.

21 Claims, 3 Drawing Sheets

METHOD AND APPARATUS FOR A SUPERVISORY CHANNEL IN A WDM FIBER-OPTIC COMMUNICATION SYSTEM

FIELD OF THE INVENTION

The invention relates to the field of fiber-optic communication systems and, in particular, to a method and apparatus for a supervisory channel in a fiber-optic communication system.

BACKGROUND OF THE INVENTION

Advanced fiber-optic communication systems using a wavelength division multiplexing (WDM) technique typically require supervisory channels (SUPVYs) to facilitate exchange of service information between the nodes of the system. Conventionally, injection of a SUPVY in the WDM system is associated with a generation of a dedicated SUPVY transmission channel outside of the WDM band, incorporation of the SUPVY data in a payload WDM channel, or additional low frequency modulation of the a payload WDM channel with the data of the SUPVY.

However, such means of providing the SUPVY add to already high cost of the fiber-optic components and complexity of modulation and demodulation schemes used in the payload channels of the WDM systems.

SUMMARY OF THE INVENTION

Various deficiencies of the prior art are addressed by the present invention of a method and apparatus for providing a supervisory channel (SUPVY) in a WDM fiber-optic communication system.

One aspect of the invention is a method for providing a SUPVY in the WDM fiber-optic communication system. According to this method, the SUPVY is formed by modulating attenuation of a variable optical attenuator disposed in an optical path between a demultiplexer (DMUX) and a multiplexer (MUX) of a downstream Optical Add-Drop Multiplexer (OADM) of the system. Information transmitted by the SUPVY is extracted and selectively demodulated in an OADM of the downstream node, thus facilitating exchange of service-related data between adjacent nodes of the WDM system.

In other embodiments of the invention are disclosed the apparatuses and communication systems suitable for executing the inventive method.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention will be generally described within the context of a long-haul terrestrial WDM fiber-optic communication system. It will be appreciated by those skilled in the art that the invention may also be utilized within the context of undersea WDM fiber-optic communication systems and short-haul WDM fiber-optic communication networks.

Hereafter, similar devices, transmission paths, and communication channels are identified using the same numeric and/or alphabetic references, except that the suffixes may be added, when appropriate, to differentiate between the specific devices, paths, and channels.

Figure 1:
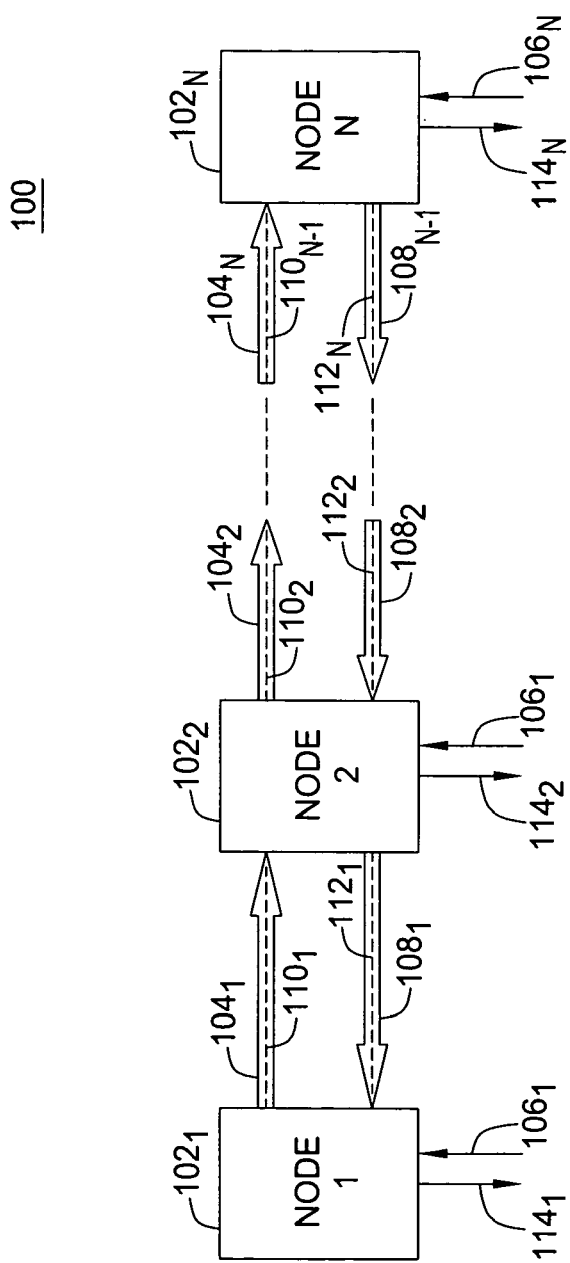
FIG. 1 depicts a high-level schematic diagram of a section of a node (e.g., a node $102_N$) of the WDM fiber-optic communication system of FIG 1. for better understanding of this embodiment of the invention, the reader should refer simultaneously to FIGS, 1 and 2. communication system suitable for use with the present invention.

FIG. 1 depicts a high-level schematic diagram of a WDM fiber-optic communication system suitable for use with the present invention. Specifically, the system 100 of FIG. 1 comprises a plurality of N nodes 102, where N is an integer greater than 1. The nodes 102 are coupled to one another using fiber-optic links 104 and 108. Each of the nodes 102 may optionally be coupled, using links 106 and 114, to a node of another communication system (not shown).

Generally, the links 104 and 108 are reduced to practice in a form of one or more fiber-optic cables. A node 102 typically comprises amplifying, transmitting, and receiving units for the payload WDM channels, as well as computing means that, in operation, facilitate functioning of the node. In the depicted embodiment, the system 100 is illustratively shown as an open chain of the nodes 102. In another embodiment, the system 100 may comprise the nodes 102 forming at least one branch and/or at least one closed loop.

In one embodiment, each of the links 104 and 108 comprises at least one optical fiber (e.g., single-mode optical fiber) and propagates a plurality of M spectrally separated optical transmission channels (i.e., WDM channels), where M is, illustratively, 32-128. Additionally, each of the links 104 and 108 carries a supervisory channel (SUPVY) 110 and 112, respectively (shown using broken lines).

The SUPVYs $110_K$ and $112_K$ are used to provide a local information exchange between adjacent nodes $102_K$ and $102_{K+1}$, of the system 100, where K<N. Typically, the SUPVY transmits information related to an operational status of the nodes and equipment associated with the nodes, signal levels in the optical transmission path between the nodes, and the like. For example, in a two node system (i.e., N=2, K=1), only nodes $102_1$ and $102_2$ are in communication.

Figure 2:
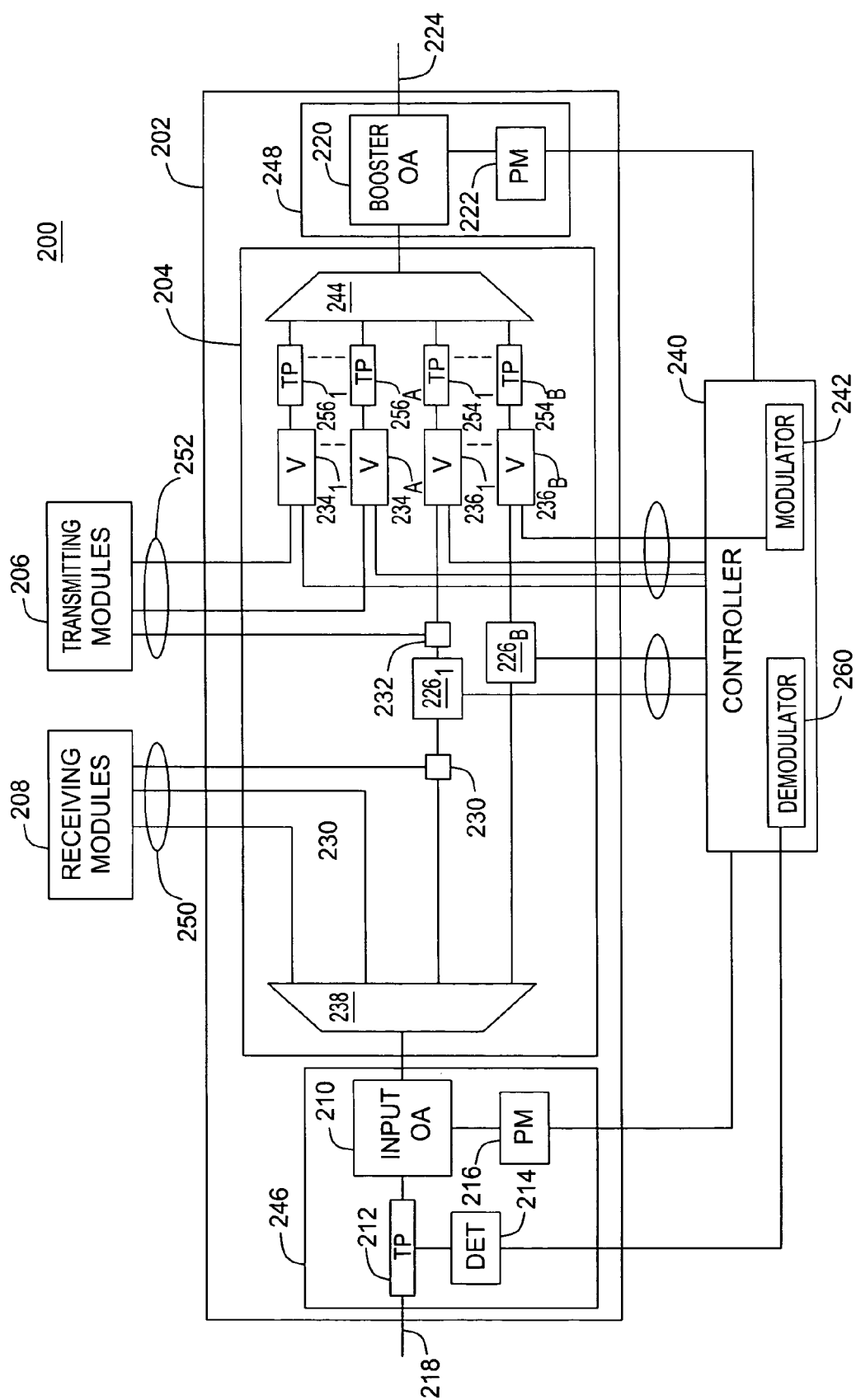
FIG. 2 depicts a high-level schematic diagram of a section of a node of the WDM fiber-optic communication system of FIG. 1 according to one embodiment of the present invention.

FIG. 2 depicts a high-level schematic diagram of a section of a node(e.g., a node $102_N$) of the WDM fiber-optic communication system of FIG. 1. For better understanding of this embodiment of the invention, the reader should refer simultaneously to FIGS. 1 and 2.

Specifically, the section 200 may be associated with one of optical fibers in the link 104 or 108. In one embodiment, the section 200 of FIG. 2 comprises a controller 240, a fiber-optic module 202, transmitting modules 206 of added WDM channels, and receiving modules 206 of dropped WDM channels.

In operation, the controller 240 (e.g., a general purpose computer associated with the corresponding input/output devices) monitors performance and transmission properties"

of components of section 200, as well as facilitates execution of pre-determined communication algorithms and programs.

In the depicted embodiment the controller 240 illustratively comprises a modulator 242 and a demodulator 260 of the SUPVY of the node $102_N$ (e.g., SUPVY $110_{N-1}$) of the system 100 of FIG. 1. Alternatively, the modulator 242 and demodulator 260 may be stand-alone devices functioning under control of the controller 240.

Referring to FIGS. 1 and 2, an input 218 of the optical module $102_N$ is coupled to an output of an optical fiber propagating from the upstream node $102_{N-1}$ of the system 100. Accordingly, an output 224 of the module $102_N$ is coupled to an input of the optical fiber propagating to a downstream node, e.g. a downstream node $102_{N+1}$ (not shown). These couplings, as well as other interconnections between optical components within the section 200 may be performed using optical connectors, fiber splicing techniques, or techniques employing optical splitters, blockers and couplers.

In the depicted embodiment, the module 202 includes an input unit 246, an output unit 248, and an Optical Add-Drop Multiplexer (OADM) 204. In another embodiment, the units 246 and 248 may be portions of the OADM 204.

The input unit 246 generally comprises a tap coupler (TP) 212 directing a small portion of an optical power of an incoming WDM signal to a photo detector 214, and an input optic amplifier (OA) 210 (e.g., erbium-doped OA) that, using a feedback signal of an input power monitor 216 or other criteria, is controlled by the controller 240. In alternate embodiments, the photo detector 214 may be an integral part of the coupler 212 or the input power monitor 216. In operation, the OA 210 amplifies the incoming WDM signal to compensate for losses of optical power in the transmission span between the upstream node $102_{N-1}$ and the node $102_N$.

The output unit 248 includes a booster OA 220 and a power monitor 222, which is further coupled (not shown) to the controller 240. In operation, the OA 220 compensates for losses of optical power in components of the OADM 204 and sets a pre-determined level of the optical power of the WDM signal at the output 224 of the module 202.

The OADM 204 generally comprises a demultiplexer (DMUX) 238 of the DWM channels; couplers 230 and 232, blockers 226, variable optical attenuators (Vs) 236 and tapped couplers 254 of B through channels; variable optical attenuators 234 and tapped couplers 256 of A (or less) added channels; and a multiplexer (MUX) 244 of the WDM channels. Herein, A and B are integers, and A+B≦M.

In alternate embodiments, at least a portion of the attenuators 234 and corresponding couplers 256 may be associated with the transmitting module 206.

Through outputs of the couplers 230 are connected to inputs of blockers 226, tap output of the couplers 230 are connected to inputs 250 of the receiving modules 208, while through outputs of the couplers 232 are connected to optical inputs of the respective variable attenuators 236. The blockers 236 are generally electrically controlled pass/block optical attenuators. In a "through" state of the OADM 204, a blocker is set to minimum attenuation to allow propagation of the respective DWM channel. Accordingly, in the "add/drop" state, the blocker is set to maximum attenuation to restrict propagation of that channel, while the channel receiver and transmitter are activated for accessing and/or transmitting the data, respectively.

The receiving module 208 may either transfer, using a link 114 of FIG. 1, the dropped WDM channel to a node of another fiber-optic system (not shown) or convert an information content of that channel in an electrical domain compatible with an attached wired or wireless communication network.

The transmitting module 206 typically comprises a means (not shown) for converting information to be transmitted by the channels of such wired or wireless communication network from the electrical domain to the optical domain, thus forming the added WDM channel(s) of the system 100 of FIG. 1. Outputs 252 of the transmitting module 206 containing the added WDM channels are coupled to the optical inputs of the respective variable attenuators 234.

In another embodiment, the transmitting module 206 may also include adapters (not shown) for receiving, via the link 106 of FIG. 1, and passing through WDM channels of another fiber-optic system (not shown).

Optical outputs of the attenuators 234 and 236 are coupled to the corresponding inputs of the MUX 244 via the tapped couplers 256 and 254, respectively. Each of the couplers 256 and 254 directs a small portion of an optical power of the respective WDM channel to a photo detector acting as a power monitor (both not shown) that is further coupled (not shown) to the controller 240.

In one embodiment, the variable optical attenuators 234 and 236 are electrically-controlled attenuators having, with respect to a control signal, an electrical bandwidth of about 1 MHz or greater. Such variable attenuators, as well as other optical components of the section 200 are commercially available.

The attenuators 234 and 236 are controlled by the controller 240 in a manner facilitating equalization of an optical power between the WDM channels. In the present invention, attenuation of at least one of the attenuators 234 and 236 (illustratively, attenuator $236_B$) is modulated by a modulator 242 of a SUPVY (e.g., SUPVY $108_K$) that superimposes low-frequency data of the SUPVY upon the high bit rate (e.g., 2.5-40 Gbs) payload information of the corresponding WDM channel. Preferably, such an attenuator is selected from plurality of the attenuators 234 of the through WDM channels of the OADM 204. Due to the small modulation depth of the low frequency SUPVY data, the data transmission of the channel is not or only minimally impaired.

Specifically, such an attenuator is provided with a control signal that is equal to a sum of a modulating signal of the SUPVY and a setting for a power equalizing attenuation for the WDM channel. The modulator 242 may utilize various modulation formats, e.g., an amplitude modulation format, a frequency modulation format, and/or a phase modulation format in a manner that an electrical bandwidth of the modulating signal is equal to or smaller than an electrical bandwidth of the attenuator being modulated.

An output signal of the modulated attenuator is a WDM channel carrying both the payload information and the data of the SUPVY. In the MUX 244, that WDM channel is combined with other WDM channels of the transmission fiber. Then, the combined optical signal is amplified by the booster OA 220 and transmitted (e.g., via the link $104_N$) from the module 200 of a node $102_N$ to the downstream node $102_{N+1}$ of the system 100 of FIG. 1.

In the downstream node $102_{N+1}$, the transmission fiber of the link $104_N$ that carries the optical signal comprising the WDM channel with the superimposed data of the SUPVY is coupled to an input module 246 of the corresponding module 202 of the upstream node. A portion of that signal is tapped by an input coupler 212 and then detected, demodulated, and analyzed by the controller of that module 202, thus forming the SUPVY between the upstream-node $102_N$ and the downstream node $102_{N+1}$ of the system 100.

In one embodiment, the modulator 242 of the upstream node and the demodulator of downstream node are selectively modified and/or configured to facilitate independent SUPVYs between the nodes of the system 100 and to limit a length of each SUPVY to a distance between the adjacent downstream and upstream nodes. Specifically, at least one modulating property of the modulator 242 (e.g., a modulation format, a carrier frequency of the modulating signal, and the like) of the downstream node and a configuration of the demodulator 260 of the upstream node may be chosen such that only the SUPVY between such nodes is selectively detected and/or demodulated in the upstream node, while signals corresponding to SUPVYs between other nodes are suppressed at the demodulator.

In one embodiment, that is accomplished by selecting a carrier frequency of SUPVY of the downstream node and configuring the demodulator of the upstream node to selective demodulate the SUPVY having that carrying frequency to suppress other SUPVYs, as well as cross-channel talks between SUPVYs in the system 100.

Figure 3:
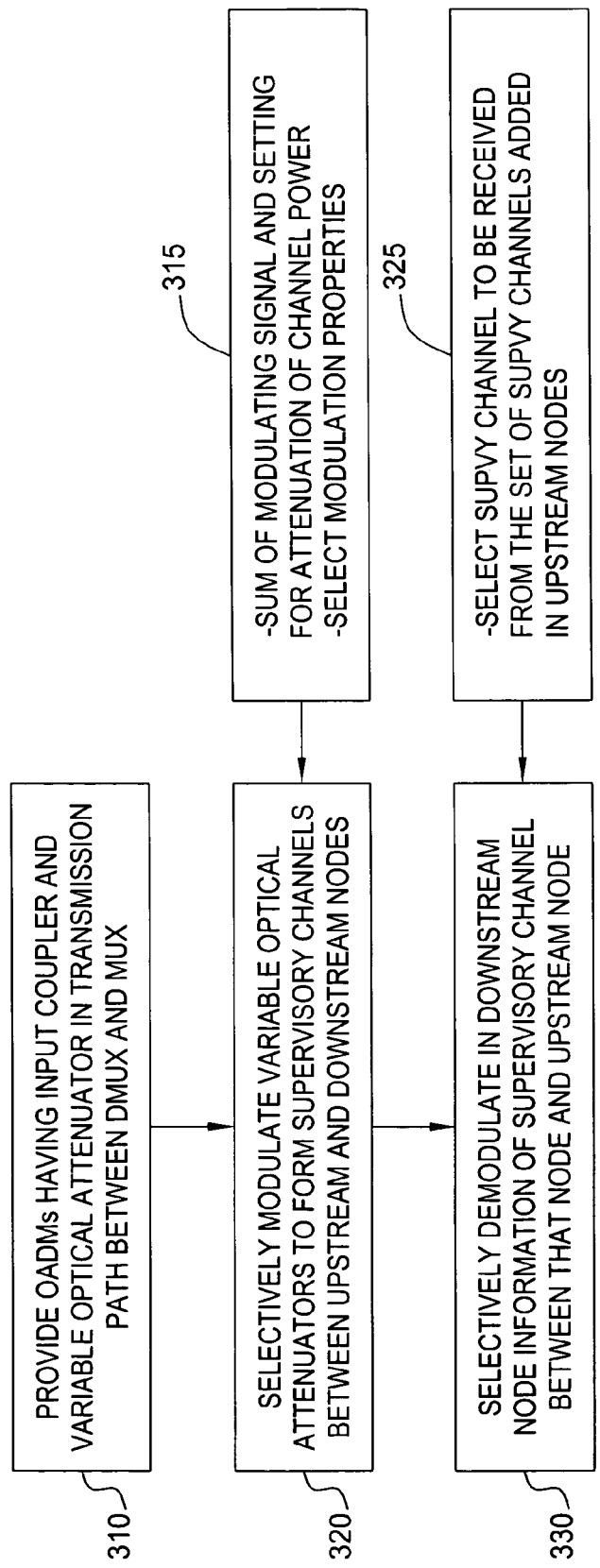
FIG. 3 depicts a flow diagram of a method for providing a supervisory channel (SUPVY) in the WDM fiber-optic communication system of FIG. 1 according to one embodiment of the present invention.

FIG. 3 depicts a flow diagram of a method for providing a SUPVY in the WDM fiber-optic communication system of FIG. 1. Specifically, the method of FIG. 3 contemplated several system functions suitable for use in accordance with the present invention.

The method of FIG. 3 starts at step 310, where the OADMs 204 having the coupler 212 and at least one variable optical attenuator 236 are provided within the nodes 102 of system 100 of FIG. 1.

At step 320, the optical attenuators 236 are selectively modulated using the modulators 242 with the data of the SUPVYs between the respective downstream and upstream nodes of the system 100.

Referring to a box 315, the modulator 242 applies to the attenuator 236 a sum of the modulating signal of the SUPVY and a setting for attenuating optical power of the WDM channel and properties of the modulating signal are selectively controlled to suppress cross-channel talks between the SUPVYs of the system 100.

At step 330, the data content of the SUPVY established between the upstream and downstream nodes is selectively demodulated by the demodulator 260 of the downstream node.

Referring to a box 325, the demodulator 260 of the downstream node may choose a SUPVY channel created by an arbitrary upstream node by selectively demodulating the information entered in that upstream node of the system 100.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for providing a supervisory channel in a multi-node wavelength division multiplexing (WDM) fiber-optic communication system, comprising:
   at an upstream node, demultiplexing a WDM optical signal; and
   modulating an attenuation level of at least one demultiplexed WDM channel of the WDM optical signal passing through the upstream node to impart thereby supervisory information to the optical signal;
   wherein said supervisory information is adapted for use by a downstream node of the system, and the attenuation level is controlled in a manner facilitating equalization of an optical power between demultiplexed WDM channels of the optical signal;
   said upstream node includes an Optical Add-Drop Multiplexer (OADM) having at least one variable optical attenuator disposed in at least one respective optical path supporting said WDM channels of the optical signal passing therethrough; and
   said variable optical attenuator is controlled using a sum of a modulating signal of the supervisory channel and a setting for a power equalizing attenuation between the demultiplexed WDM channels.

2. The method of claim 1 wherein the supervisory channel is modulated according to at least one of an amplitude modulation format, a frequency modulation format and a phase modulation format.

3. The method of claim 1, further comprising:
   selectively modifying said attenuator of the upstream node and a demodulator of a downstream node to limit a length of the supervisory channel to a distance between said upstream and downstream nodes.

4. The method of claim 1, comprising:
   modifying, in a modulator of the upstream node, at least one modulating property selected from the group consisting of a modulation format and a carrier frequency of the modulating signal; and
   configuring a demodulator of the downstream node to selectively demodulate the modulating signal of the upstream node.

5. The method of claim 1, further comprising:
   extracting, at a downstream node, information from the supervisory channel node by providing the node with an input optical coupler having a tap coupled to a demodulator of the supervisory channel.

6. An apparatus for a supervisory channel in a multi-node wavelength division multiplexing (WDM) fiber-optic communication system, comprising:
   a first node having at least one variable optical attenuator disposed in an optical path between an output of a demultiplexer (DMUX) and an input of a multiplexer (MUX) of an Optical Add-Drop Multiplexer (OADM) of the system, the at least one variable optical attenuator being controlled by a modulator associated with the supervisory channel in a manner facilitating equalization of an optical power between demultiplexed WDM channels, wherein the modulator modulates said variable optical attenuator with a sum of a modulating signal of the supervisory channel and a setting for a power equalizing attenuation between the demultiplexed WDM channels; and
   an input optical coupler having a tap coupled to a demodulator of the supervisory channel.

7. The apparatus of claim 6 wherein the modulator uses at least one of an amplitude modulation format, a frequency modulation format and a phase modulation format.

8. The apparatus of claim 6 wherein the modulating signals provided by different nodes have different carrier frequencies.

9. The apparatus of claim 6 wherein the demodulator of a downstream node is configured to selectively demodulate the modulating signal used in the modulator of the upstream node.

10. An Optical Add-Drop Multiplexer (OADM) of a multi-node wavelength division multiplexing (WDM) fiber-optic communication system, comprising:
    a controller including a modulator and a demodulator of a supervisory channel;
    a demultiplexer (DMUX) and a multiplexer (MUX) of transmitted WDM channels where at least one of the demultiplexed WDM channels comprises a variable optical attenuator wherein attenuation is controlled by said modulator in a manner facilitating equalization of an optical power between demultiplexed WDM channels;

an input optical coupler having a tap coupled to said demodulator; and an output optical amplifier coupled to an output of the MUX;

wherein the modulator modulates said variable optical attenuator with a sum of a modulating signal of the supervisory channel and a setting for a power equalizing attenuation of an optical power between the demultiplexed WDM channels.

11. The OADM of claim 10 wherein the modulator uses at least one modulation format selected from the group consisting of an amplitude modulation format, a frequency modulation format, and a phase modulation format.

12. The OADM of claim 10 wherein the modulating signals of downstream nodes have different carrier frequencies.

13. The OADM of claim 10 wherein the demodulator of a downstream node is adapted to selective demodulate the upstream node modulating signal.

14. A wavelength division multiplexing (WDM) fiber-optic communication system, comprising:

a plurality of nodes, each node having at least one Optical Add-Drop Multiplexer, comprising:

a controller including a modulator and a demodulator of a supervisory channel; a demultiplexer (DMUX) and a multiplexer (MUX) of transmitted WDM channels where at least one of the demultiplexed WDM channels comprises a variable optical attenuator wherein attenuation is controlled by said modulator in a manner facilitating equalization of an optical power between demultiplexed WDM channels;

an input optical coupler having a tap coupled to said demodulator;

an input optical amplifier;

an output optical amplifier;

a plurality of fiber-optic cables interconnecting said nodes; and pluralities of transmitting modules and receiving modules coupled to said nodes;

wherein the demodulator of a downstream node is configured to selectively demodulate the modulating signal used in the modulator of the upstream node; and the modulator provides to said variable optical attenuator a sum of a modulating signal of the supervisory channel and a setting for a power equalizing attenuation of an optical power between the demultiplexed WDM channels.

15. The system of claim 14 wherein:

the modulator uses at least one modulation format selected from the group consisting of an amplitude modulation format, a frequency modulation format, and a phase modulation format.

16. The method of claim 1 wherein said OADM further includes at least one variable optical attenuator disposed in at least one optical path supporting respective WDM channels added to the optical signal.

17. The method of claim 16, wherein the attenuation level is further controlled in a manner facilitating equalization of an optical power between the WDM channels of the optical signal and the WDM channels added to the optical signal, utilizing the at least one variable optical attenuator disposed in at least one optical path supporting respective WDM channels added to the optical signal.

18. The Optical Add-Drop Multiplexer (OADM) of claim 10 further comprising:

at least one variable optical attenuator disposed in at least one optical path supporting respectively added WDM channels.

19. The optical Add-Drop Multiplexer of claim 18, wherein the attenuation is further controlled in a manner facilitating equalization of an optical power between the demultiplexed WDM channels and the respectively added WDM channels, utilizing the at least one variable optical attenuator disposed in at least one optical path supporting respectively added WDM channels.

20. The wavelength division multiplexing (WDM) fiber optic communication system of claim 14 wherein a plurality of transmitting modules and receiving modules are respectively configured to add WDM channels and process dropped WDM channels.

21. The wavelength division multiplexing (WDM) fiber optic communication system of claim 20, further comprising a variable optical attenuator disposed in an optical path of at least one added WDM channel, wherein the attenuation is further controlled in a manner facilitating equalization of an optical power between the demultiplexed WDM channels and the at least one added WDM channel, utilizing the variable optical attenuator disposed in an optical path of at least one added WDM channel.

* * * * *